United States Patent [19]
Yamada

[11] Patent Number: 5,222,207
[45] Date of Patent: Jun. 22, 1993

[54] METHOD AND SYSTEM FOR DETERMINING SEGMENT TYPES IN FIGURE REPRESENTED BY STRAIGHT SHORT VECTORS

[75] Inventor: Keiichi Yamada, Oome, Japan

[73] Assignee: Kabushiki Kaisha Toshiba, Kawasaki, Japan

[21] Appl. No.: 511,734

[22] Filed: Apr. 20, 1990

[30] Foreign Application Priority Data

Apr. 20, 1989 [JP] Japan ................................. 1-100527

[51] Int. Cl.⁵ ............................................. G06F 15/72
[52] U.S. Cl. .................................... 395/142; 395/141;
395/143; 340/728; 340/747
[58] Field of Search .................. 364/518, 521, 522;
340/747, 750, 728, 703, 734; 395/141, 142, 143;
382/46, 47

[56] References Cited

U.S. PATENT DOCUMENTS

| 4,346,445 | 8/1982 | Leuenberger et al. | 364/520 |
| 4,821,207 | 4/1989 | Ming et al. | 364/513 |
| 4,961,150 | 10/1990 | Seki et al. | 364/474.29 |

FOREIGN PATENT DOCUMENTS

0151316 8/1985 European Pat. Off. .
2203613 10/1988 United Kingdom .

OTHER PUBLICATIONS

A Method for Interpolating Reasonable-Shaped Curves Through Any Data by J. Butland Computer Graphics (1980) pp. 409–422.
URW verlag: "Digital Formats for Typeface" (by Peter Karow), 1987, pp. 102–105.
Patent Abstracts of Japan, vol. 12, No. 178, May 1988, JP-A-62 287 376, Dec. 1987.

*Primary Examiner*—Phu K. Nguyen
*Attorney, Agent, or Firm*—Cushman, Darby & Cushman

[57] ABSTRACT

When straight short vectors representing a predetermined figure are given, a connecting point determination section determines a connection state of a connecting point of each straight short vector. In accordance with the determination result, an attribute information setting section sets attribute information for each connecting point. On the basis of the set attribute information, a segment type determination section determines the segment type of each straight short vector. In this manner, the straight short vectors are classified into straight and curve segments. Curve fitting can be performed for the curve segments.

4 Claims, 5 Drawing Sheets

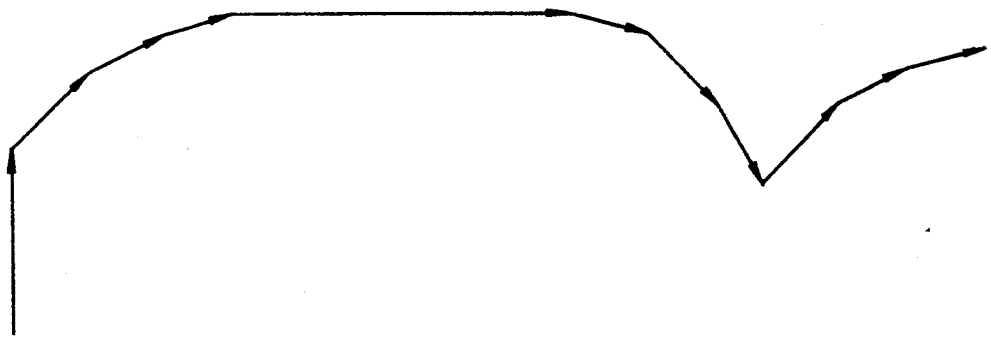
F I G. 1
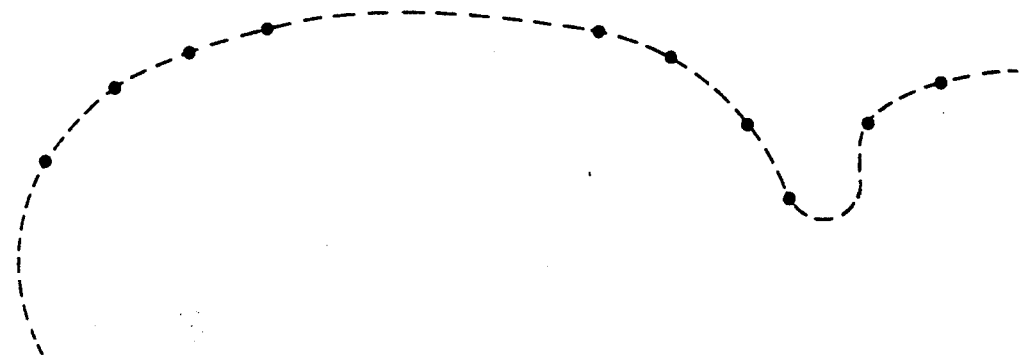
F I G. 2
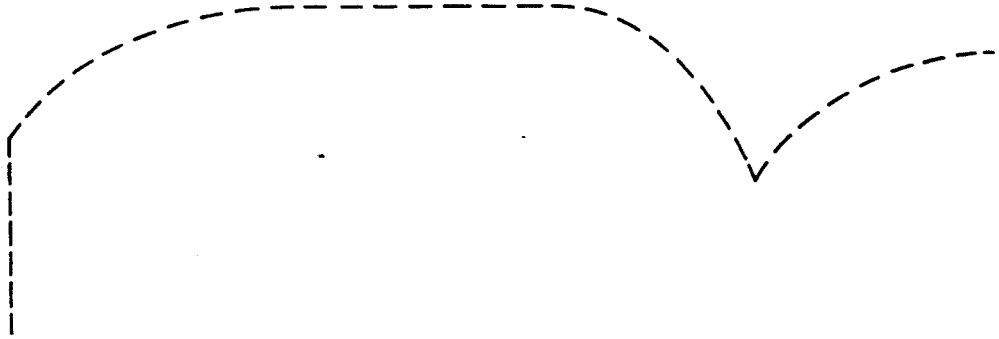
F I G. 8

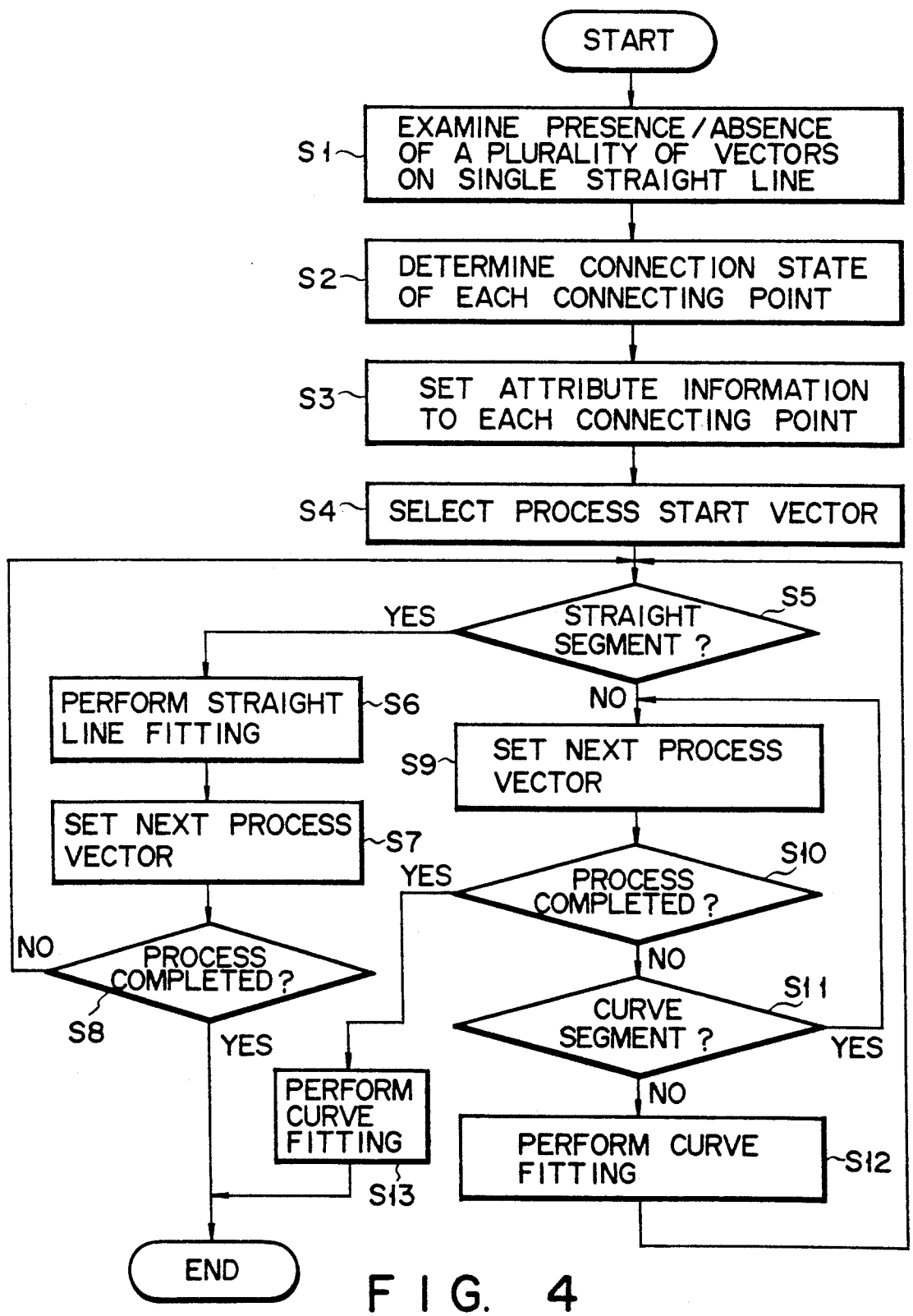
F I G. 4

| ATTRIBUTE OF VECTOR OF START POINT | ATTRIBUTE OF VECTOR OF END POINT | SEGMENT TYPE |
|---|---|---|
| TR | TL | CURVE |
| TL | TR | STRAIGHT |
| TR | CO | CURVE |
| TL | CO | STRAIGHT |
| CO | TR | STRAIGHT |
| CO | TL | CURVE |
| CO | CU | CURVE |
| CU | CO | CURVE |
| TR | CU | CURVE |
| TL | CU | — |
| CU | TR | — |
| CU | TL | CURVE |
| CO | CO | STRAIGHT |
| CU | CU | CURVE |
| TL | TL | — |
| TR | TR | — |

FIG. 7

METHOD AND SYSTEM FOR DETERMINING SEGMENT TYPES IN FIGURE REPRESENTED BY STRAIGHT SHORT VECTORS

BACKGROUND OF THE INVENTION

1. Field of the Invention

The present invention relates to a method and system for determining segment types in a figure represented by straight short vectors.

2. Description of the Related Art

In order to acquire a contour of a character, a graphic pattern or the like in the fields of e.g., computer graphics, CAD (computer aided design) and outline font production, a method of fitting a Bezier curve to a plurality of straight short vectors approximately representing an original figure is used. When an original figure is to be reconstructed on the basis of straight short vectors as shown in FIG. 1, a figure as shown in FIG. 2 (PRIOR ART) is obtained by fitting the Bezier curve to each straight short vector.

That is, when the straight short vectors as shown in FIG. 1 represent for an original figure having straight and curve segments, a curve is fitted to every straight short vector to acquire a contour of a character, a graphic pattern or the like. As shown in FIG. 2 (PRIOR ART), however, an acquired graphic pattern or the like sometimes does not coincide with the figure represented by the straight short vectors. This is because curve fitting cannot be performed in consideration of the fact that a figure often has both straight and curve segments and straight and curve segments constituting a figure cannot be easily distinguished from each other.

Therefore, a demand has arisen for a method of easily determining segment types in a figure represented by straight short vectors.

SUMMARY OF THE INVENTION

It is an object of this invention to provide a method and system for determining segment types in a figure represented by straight short vectors.

According to one aspect of the present invention, there is provided a method for determining segment types in a figure represented by straight short vectors, the method comprising the steps of:

determining connection states of connecting points of the straight short vectors;

setting attribute information to each connecting point in accordance with the determined connection state; and determining the segment types of the straight short vectors in accordance with the set attribute information.

According to another aspect of the present invention, there is provided a system for determining segment types in a figure represented by straight short vectors, the system comprising:

first determining connection means for determining states of connecting points of the straight short vectors;

means for setting attribute information to each connecting point in accordance with the determined connection states; and second determining means for determining the segment types of the straight short vectors in accordance with the set attribute information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a view showing straight short vectors;

FIG. 2 (PRIOR ART) is a view showing a result of curve fitting to the straight short vectors shown in FIG. 1;

FIG. 4 is a flow chart for explaining an operation of the embodiment system shown in FIG. 3;

FIG. 7 is a view showing a table for determining a segment type specified by a combination of attribute information of start and end points of a straight short vector; and FIG. 8 is a view showing a result of curve fitting to the straight short vectors shown in FIG. 1 obtained by a process according to the embodiment system shown in FIG. 3.

DETAILED DESCRIPTION OF THE PREFERRED EMBODIMENT

An embodiment of the present invention will be described below with reference to the accompanying drawings.

Figure 3:
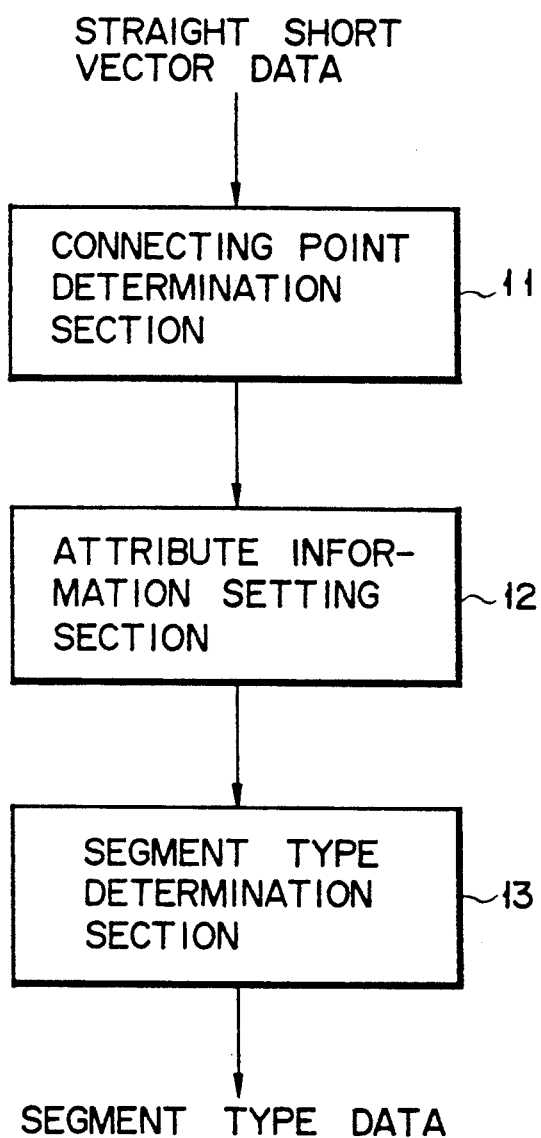
FIG. 3 is a block diagram showing an arrangement of a system according to an embodiment of the present invention.

Referring to FIG. 3, an embodiment system comprises a connecting point determination section 11, an attribute information setting section 12 and a segment type determination section 13.

The connecting point determination section 11 determines a connection state of a connecting point of each straight short vector on the basis of straight short vector data.

In accordance with a determination result of the connecting point determination section 11, the attribute information setting section 12 sets attribute information indicating a connection state of a straight short vector of a connecting point of each straight short vector.

On the basis of the attribute information set by the attribute information setting section 12, the segment type determination section 13 determines the segment type of each straight short vector. That is, the section 13 checks whether each straight short vector is a straight segment or a curve segment. As a result, segment type data is obtained.

Figure 5:
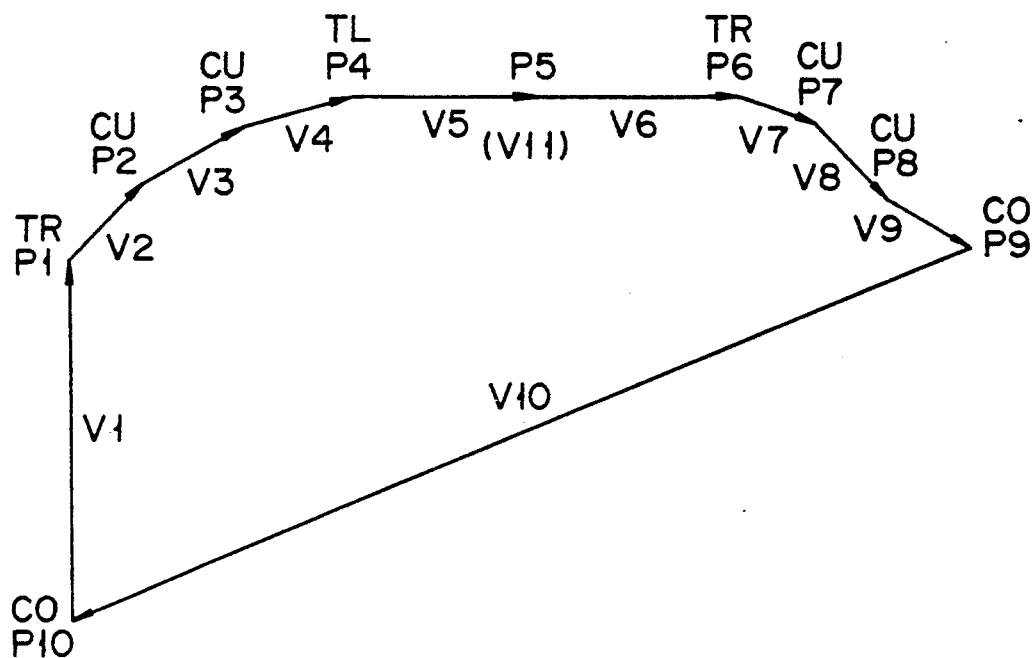
FIG. 5 is a view showing straight short vectors to be processed by the embodiment system shown in FIG. 3.

An operation of the above system will be described below with reference to a flow chart shown in FIG. 4. In this embodiment, a process for straight short vectors V1 to V10 as shown in FIG. 5 will be described. Assume that connecting points of the vectors V1 to V10 are P1 to P10 and a connecting point between straight short vectors Vi and Vi+1 ($1 \leq i \leq 9$) is Pi. Note that the connecting point between the vectors V10 and V1 is P10.

In step S1, the connecting point determination section 11 examines the presence/absence of a plurality of continuous straight short vectors on a single straight line on the basis of straight short vector data. If a plurality of straight short vectors are present on a single straight line, these vectors are processed as a single straight short vector. In FIG. 5, the vectors V5 and V6 are processed as a single straight short vector V11.

In step S2, the connecting point determination section 11 determines a connection state in a connecting point Pi of a straight short vector. That is, the section 11 checks, in a figure represented by straight short vectors, whether or not the connecting point Pi is (1) a corner point for forming a corner (not having a continuous gradient), (2) a tangent point at which a curve segment smoothly connects to a straight segment in a connection direction of a straight short vector, (3) a tangent point at which a straight segment smoothly connects to a curve segment in a connection direction of a straight short vector, or (4) a point on a curve.

Figure 6:
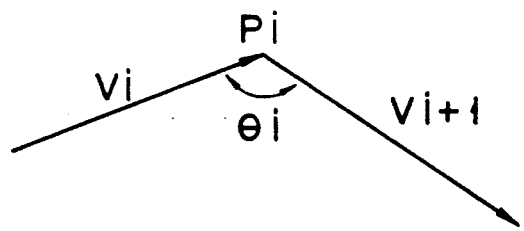
FIG. 6 is a view for explaining a method of determining a connection state in a connecting point of straight short vectors.

If an angle $\theta i$ formed by two straight short vectors Vi and Vi+1 as shown in FIG. 6 and a predetermined reference angle $\theta ref$ satisfy a relation of $\theta i < \theta ref$, a connecting point Pi between the vectors Vi and Vi+1 is determined to be a corner point.

If a point Qi is set on a line Li connecting a point Ai for dividing the vector Vi at a ratio of 5:1 and a point Bi for dividing the vector Vi+1 at a ratio of 1:5 and a relation of $|Pi-Qi| > \delta$ is satisfied, i.e., a distance between Pi and Qi is larger than a reference value $\delta$, the connecting point Pi can be determined to be a corner point. Note that $\delta$ is a value indicating a predetermined distance.

If the connecting point Pi between the vectors Vi and Vi+1 is not a corner point, it is checked whether or not the connecting point Pi is a tangent point at which a curve segment is connected to a straight segment.

If the vectors Vi and Vi+1 satisfy relations of $|Vi+1| > A$, $|Vi+1|/|Vi| > B$, and $(\pi - \theta i) > \theta min$, the connecting point Pi between the vectors Vi and Vi+1 is determined to be a tangent point at which a curve segment smoothly connects to a straight segment. Note that A, B ($>1$) and $\theta min$ are predetermined constants.

If the vectors Vi and Vi+1 satisfy relations of $|Vi| > A$, $|Vi|/|Vi+1| > B$, and $(\pi - \theta i) > \theta min$, the connecting point P1 is determined to be a tangent point at which a straight segment smoothly connects to a curve segment.

If the connecting point Pi between the vectors Vi and Vi+1 is neither a corner point nor a tangent point between curve and straight segments, it is determined to be a point on a curve.

The above connecting point determination method is experimentally proved, and the constants A and B and $\theta min$ are set to be, e.g., 15, 1.8 and 0.05 rad, respectively.

In step S3, the attribute information setting section 12 sets attribute information indicating a connection state of a connecting point. Assume that attribute information indicating a corner point (not having a continuous gradient) is CO, attribute information indicating a point at which a curve segment is smoothly connected to a straight segment in a connection direction of a straight short vector is TL, attribute information indicating a point at which a straight segment is smoothly connected to a curve segment in a connection direction of a straight short vector is TR, and attribute information indicating a point on a curve is CU. In the straight short vectors shown in FIG. 5, CO is set at each of the connecting points P9 and P10; TL, at the connecting point P4; TR, at each of the connecting points P1 and P6; and CU, at each of the connecting points P2, P3, P7 and P8.

In step S4, on the basis of the attribute information of each connecting point, a straight short vector from which a segment type determination process is started is selected. If a vector having a connecting point determined to be a corner point as a start point is present, the segment type determination section 13 starts the segment type determination process from this vector. In this embodiment, the vector V1 corresponds to the determination process start vector.

In step S5, on the basis of the segment type determination table shown in FIG. 7, whether or not a straight short vector is a straight segment is checked. For example, since the attribute information of the start and end points P10 and P1 are CO and TR, respectively, the vector V1 is determined to be a straight segment.

In step S6, straight line fitting is performed.

In step S7, the next process vector is set.

In step S8, whether or not the segment type determination process is completed is checked. If the determination process is not completed, the process in step S5 is performed. Since attribute information of start and end points of the vector V2 are TR and CU, respectively, the vector V2 is determined not to be a straight segment, i.e., determined to be a curve segment, and the next process vector is set (step S9).

In step S10, whether or not the segment type determination process is completed is checked. If the determination process is not completed, whether or not the straight short vector is a curve segment is checked in step S11 on the basis of the segment type determination table shown in FIG. 7.

Since the vector V3 is determined to be a curve segment in step S11, the next process vector is set (step S9).

Steps S9 to S11 are repeatedly performed until a process vector is determined not to be a curve segment in step S11 or the determination process is completed in step S10. In this embodiment, the vectors V2 to V4 are determined to be a continuous curve segment and curve fitting is performed for these vectors (step S12).

If the determination process is completed in step S10, curve fitting is performed (step S13).

As described above, it is checked whether each of the straight short vectors to be sequentially processed is a curve or straight segment, and straight or curve fitting is performed.

By such a determination process, the straight short vectors V1 to V11 as shown in FIG. 5 are classified as follows.

vector V1 . . . straight segment
vectors V2 to V4 . . . curve segment
vector V11 . . . straight segment
vectors V7 to V9 . . . curve segment
vector V10 . . . straight segment Such segment type data is used in the fields of computer graphics, CAD, outline font production and the like. That is, when a contour of a character, a graphic pattern or the like is to be acquired by fitting a Bezier curve, for example, on the basis of straight short vectors approximately representing an original figure, curve fitting can be performed for only straight short vectors determined to be curve segments. As for the straight short vectors shown in FIG. 5, curve fitting is performed for the segments of the vectors V2 to V4 and V7 to V9.

As described above, in order to reconstruct a figure approximate to an original figure by straight short vectors as shown in FIG. 1, curve fitting is conventionally performed for all the straight short vectors. Therefore, the figure as shown in FIG. 2 is reconstructed. According to the present invention, however the figure as shown in FIG. 8 can be obtained by fitting a straight line to a straight segment and a curve to a curve segment. Therefore, a figure approximate to an original figure can be obtained by using a determination result obtained on the basis of straight short vectors.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A method for generating and displaying a curved image comprising the steps of:
   receiving an image in the form of straight short vectors, said straight short vectors corresponding to at least one straight segment and at least one curve segment;
   determining segment types of said straight short vectors to distinguish between said at least one straight segment and said at least one curve segment;
   fitting a curve to said at least one curve segment and a straight line to said at least one straight segment; and
   thereby generating a curved image in the form of curved and straight lines;
   wherein said segment type determining step includes the steps of:
   analyzing connecting points of said straight short vectors, said connecting points being points between two adjoining straight short vectors;
   setting attribute information to each of said connecting points in accordance with each of said analyzed connecting points; and
   thereby determining said segment types of said straight short vectors.

2. The method according to claim 1, wherein said analyzing connecting points step includes the steps of:
   determining whether or not said connecting point is a corner point;
   determining whether or not said connecting point is a tangent point; and
   determining whether or not said connecting point is a point on said curve segment.

3. A system for generating and displaying a curved image comprising:
   means for receiving an image in the form of straight short vectors, said straight short vectors corresponding to at least one curve segment and at least one straight segment;
   means for determining segment types of said straight short vectors to distinguish between said at least one straight segment and said at least one curve segment;
   means for fitting a curve to said at least one curve segment and a straight line to said at least one straight segment; and
   means, responsive to said fitting means, for generating a curved image in the form of said curve and said straight line;
   wherein said means for determining segment types includes:
   analyzing means for analyzing connecting points of said straight short vectors, said connecting being points between two adjoining straight short vectors;
   means for setting attribute information to each other said connecting points in accordance with each of said determined connection states; and
   determining means for determining said segment types of said straight short vectors in accordance with the set attribute information.

4. The system according to claim 3, wherein said analyzing means for analyzing connecting points includes:
   means for determining whether or not said connecting point is a corner point;
   means for determining whether or not said connecting point is a tangent point; and
   means for determining whether or not said connecting point is a point on said curve segment.

* * * * *